United States Patent [19]
Malamphy

[11] Patent Number: 5,845,605
[45] Date of Patent: Dec. 8, 1998

[54] BIRD BATH

[76] Inventor: Gerald E. Malamphy, 88 Plymouth Ave., Trumbull, Conn. 06611

[21] Appl. No.: 935,964

[22] Filed: Sep. 23, 1997

[51] Int. Cl.⁶ .................................................. A01K 39/02
[52] U.S. Cl. ............................................ 119/69.5; 119/74
[58] Field of Search ............................... 119/69.5, 74, 80, 119/81, 61

[56] References Cited

U.S. PATENT DOCUMENTS

| | | |
|---|---|---|
| 1,141,794 | 6/1915 | Harris ......................................... 119/61 |
| 1,603,198 | 10/1926 | Edington .................................... 119/61 |
| 1,632,842 | 6/1927 | Liening ...................................... 119/61 |
| 2,191,811 | 2/1940 | Trampier, Sr. ............................. 119/61 |
| 2,941,502 | 6/1960 | Pusey ...................................... 119/69.5 |
| 3,995,591 | 12/1976 | Garwood . | |
| 4,640,226 | 2/1987 | Liff ......................................... 119/69.5 |
| 5,002,017 | 3/1991 | Hollyday et al. ......................... 119/73 |
| 5,117,779 | 6/1992 | Karow .................................... 119/69.5 |
| 5,195,463 | 3/1993 | Lorenza et al. ............................ 119/77 |
| 5,438,957 | 8/1995 | Shagoury ................................ 119/69.5 |

*Primary Examiner*—Thomas Price
*Assistant Examiner*—Yvonne R. Abbott
*Attorney, Agent, or Firm*—Angelo N. Chaclas

[57] ABSTRACT

A bird bath including a base having a basin for holding a first supply of water for a bird to access and a housing including a reservoir for holding a second supply of water. The housing is spaced vertically above the base so that the reservoir is positioned above the basin. The reservoir includes a drain hole for allowing water to drop from the second supply of water to the first supply of water causing a ripple on the surface of the first supply of water so that the first supply of water is less likely to freeze.

20 Claims, 4 Drawing Sheets

BIRD BATH

FIELD OF THE INVENTION

The present invention relates generally to bird baths. More particularly, the present invention relates to a bird bath for keeping a supply of water from turning into ice at temperatures below freezing.

BACKGROUND OF THE INVENTION

It has long been a favorite pastime to view wildlife in their free state. One such activity in which many participate is bird watching. Enthusiasts often use a bird bath which includes a basin for holding a supply of water to attract the birds. Generally, the birds are drawn to the water supply and in this manner they may be observed as they drink and otherwise congregate around the water supply. Sometimes, a bird feeder is used in conjunction with the bird bath to provide an added measure for attracting the birds to a given area.

Due to evaporation and bird activity, bird baths require periodic refilling. Some prior art systems based upon pressure differentials have been developed for automatically refilling the basin with water. Such systems generally employ an elevated reservoir of water that refills the basin through a supply tube having a first end connected with the reservoir and a second end connected with the basin. When the water in the reservoir falls below a predetermined level, the second end of the supply tube comes into contact with ambient air and a small amount of water is released down from the reservoir to the basin, in response to an amount of air traveling up the supply tube to the reservoir, until the second end of the supply tube is again covered by the water in the basin.

Although such prior art bird baths work generally well, they suffer from disadvantages and drawbacks. First, they are susceptible to freezing in colder climates. Because the water in the basin may remain stagnate for long periods due to a low evaporation rate and/or lack of bird activity, the water in the basin is likely to turn to ice when the ambient temperature drops below freezing. Second, such prior art bird baths rely on an elevated reservoir which is under a vacuum so that water from the reservoir is only released when the second end of the supply tube is exposed to the environment. Otherwise, the water in the reservoir would simply come rushing out all at once. Thus, a proper vacuum must be maintained if the system is to operate effectively. This is often difficult to accomplish in practice due to the need to have access to the reservoir to replenish it. As a result, screw tops with seals are often provided with the reservoir.

Still other prior art bird baths have been developed which address the need of keeping the water in the basin from freezing. Although these prior art bird baths work generally well, they also suffer from disadvantages and drawbacks. For example, some of these prior art bird baths, such as the one described in U.S. Pat. No. 4,640,226, employ a power source (solar, electrical, etc.) to heat the water in the basin to prevent it from freezing. Thus, these prior art bird baths require a power source which is often not available in remote locations. Also, these prior art bird baths are typically not economical to purchase or operate. As another example, still other bird baths, such as the one described in U.S. Pat. No. 5,002,017, seek to prevent the water in the basin from freezing by enclosing the water in an insulated container and only providing a small opening in the container for the birds to gain access to the water. In this manner, the water supply is substantially isolated from ambient air. However, as a consequence the birds cannot preen themselves which is essential in the winter time. Moreover, in such enclosed containers the birds cannot be observed as they drink from the water.

Based on the above discussion, it becomes apparent that there is a need for a bird bath which keeps a water supply from freezing without the need of a power source and which allows the birds to preen themselves and be observed as they drink from and congregate around the water supply.

SUMMARY OF THE INVENTION

It is an object of the present invention to present a bird bath that substantially overcomes the disadvantages and drawbacks associated with the prior art bird baths.

In accomplishing this and other objects, there is provided a bird bath including a base having a basin for holding a first supply of water for a bird to access and a housing including a reservoir for holding a second supply of water. The housing is spaced vertically above the base so that the reservoir is positioned above the basin. The reservoir includes a drain hole for allowing water to drop from the second supply of water to the first supply of water causing a ripple on the first supply of water so that the first supply of water is less likely to freeze.

Therefore, it should now be apparent to those skilled in the art that the bird bath of the present invention does not require a source of power and keeps the first supply of water in the basin from freezing in a convenient and cost effective manner.

Additional objects and advantages of the invention will be set forth in the detailed description which follows and, in part, will be obvious to those skilled in the art from the detailed description, or may be learned by practice of the invention.

BRIEF DESCRIPTION OF THE DRAWINGS

The accompanying drawings, which are incorporated in and constitute a part of the specification, illustrate a presently preferred embodiment of the present invention. The drawings, together with the general description given above and the detailed description of the preferred embodiments given below, serve to explain the principles of the invention.

DETAILED DESCRIPTION OF THE PREFERRED EMBODIMENTS

Figure 1:
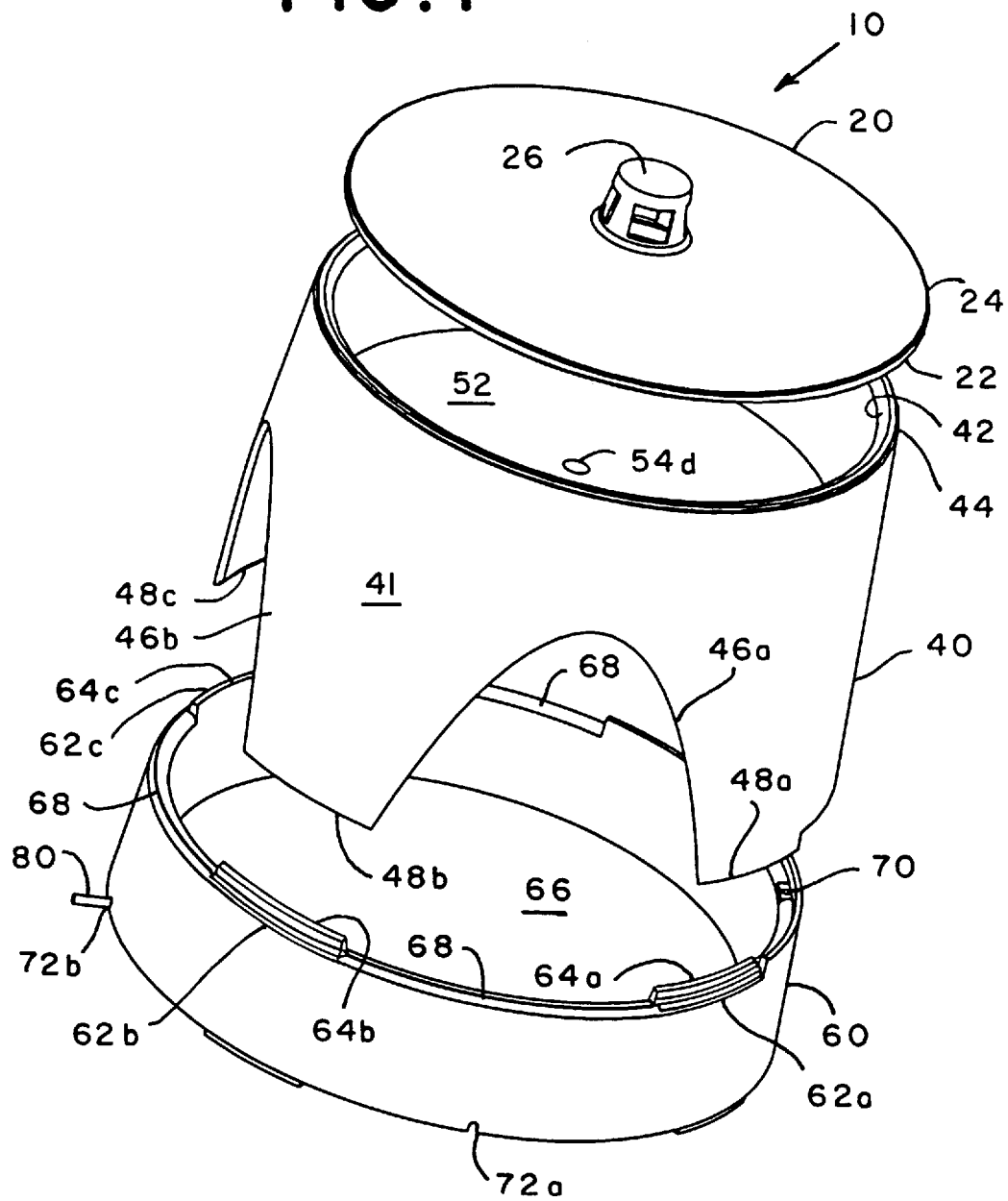
FIG. 1 is an exploded perspective downward angled view of a bird bath in accordance with the present invention.

Referring to FIG. 1, an exploded perspective view of a bird bath 10 in accordance with the present invention is shown. The bird bath 10 comprises a cover 20 having a knob 26, a housing 40, a base 60 and a run off or overflow tube 80.

Figure 2:
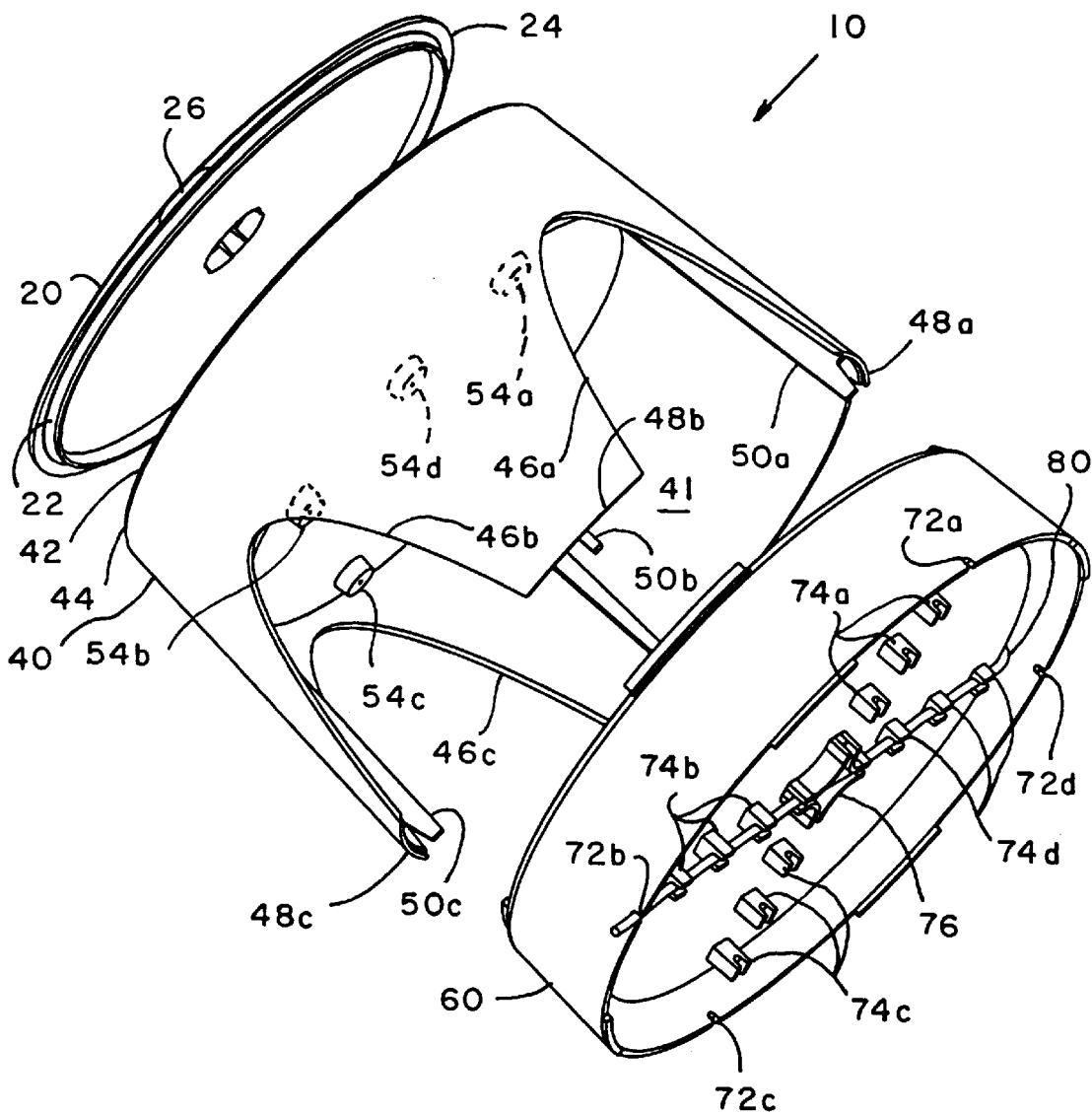
FIG. 2 is an exploded perspective upward angled view of the bird bath in accordance with the present invention.
Figure 3:
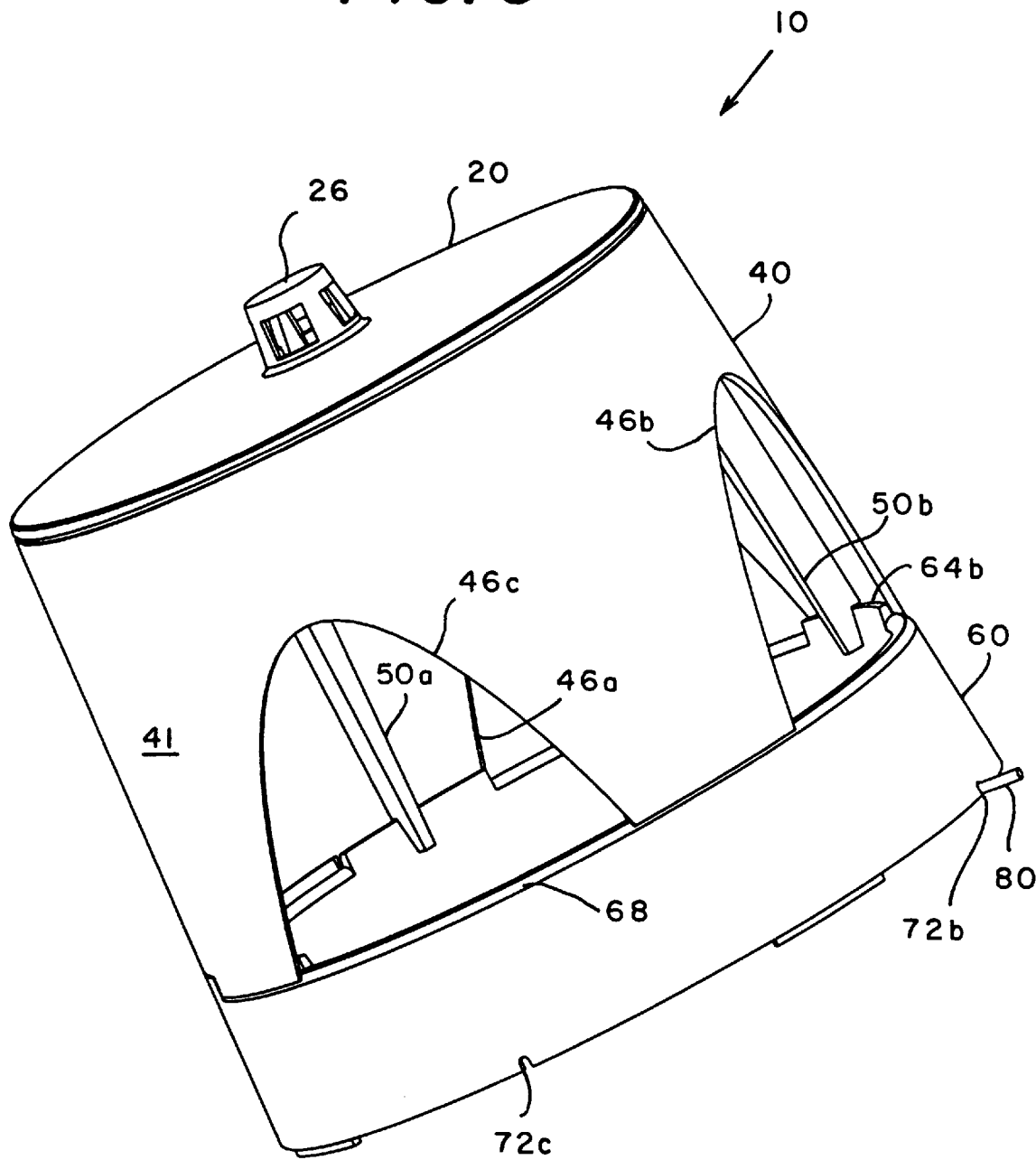
FIG. 3 is an assembled perspective view of the bird bath in accordance with the present invention.

The cover 20, the housing 40 and the base 60 are of generally cylindrical shape and are designed with interlocking mating surfaces, respectively. The cover 20 includes a peripheral edge 24 and a rib 22 offset a predetermined distance from the peripheral edge 24. The housing 40 includes a contoured surface 42 located along its top edge 44 which is adapted to receive and mate with the rib 22 of the cover 20 in a secure fashion. Referring to FIGS. 1, 2 and 3, the housing 40 also includes a cylindrical exterior wall 41 having a plurality of openings 46a, 46b and 46c which will be described in more detail below. Between the plurality of openings 46a, 46b and 46c, the housing 40 further includes a plurality of notched edges 48a, 48b and 48c which are adapted to sit on a plurality of respective surfaces 62a, 62b and 62c on the base 60. For additional stability, in the preferred embodiment, the housing 40 also includes a plurality of gussets 50a, 50b and 50c which capture respective raised portions 64a, 64b and 64c located on the base 60 adjacent to the surfaces 62a, 62b and 62c, respectively. It should now be apparent to those skilled in the art that the cover 20, the housing 40 and the base 60 are adapted to be securely and detachably assembled into an integral structure.

The housing 40 further includes a reservoir 52 for holding a supply of water (not shown). Located within the bottom of the reservoir 52 are a plurality of drain holes 54a, 54b, 54c and 54d. Some of the drain holes 54a, 54b and 54c are biased outward toward the exterior wall 41 and are in turn centered about the plurality of openings 46a, 46b and 46c, respectively. On the other hand, the drain hole 54d is centrally located within the reservoir 52 along the axis of the cylindrical shaped housing 40.

The base 60 further includes an integrally formed basin 66 for holding a supply of water (not shown), a perch 68 located in corresponding relationship to the plurality of openings 46a, 46b and 46c so as to provide a landing place for a bird (not shown), an overflow hole 70, a plurality of notches 72a, 72b, 72c and 72d, a plurality of series of retaining clips 74a, 74b, 74c and 74d aligned with the plurality of notches 72a, 72b, 72c and 72d, respectively, and a multi-directional retaining clip 76. The overflow hole 70 is spaced vertically below the perch 68 while the overflow tube 80 extends between the overflow hole 70 and a predetermined one of the plurality of notches 72a, 72b, 72c and 72d.

The retaining clips 74a, 74b, 74c and 74d and the multi-directional retaining clip 76 assist in securing and directing the overflow tube 80 from the overflow hole 70 to a predetermined one of the plurality of notches 72a, 72b, 72c and 72d. If the overflow tube 80 extends to notch 72b, as shown, then the overflow tube 80 is secured by retaining clips 74d and 74b and passes straight through the multidirectional retaining clip 76. On the other hand, if the overflow tube 80 extends to notch 72a, then the overflow tube 80 is secured by retaining clips 74d and 74a and passes at a right angle through the multi-directional retaining clip 76. Similarly, if the overflow tube 80 extends to notch 72c, then the overflow tube 80 is secured by the retaining clips 74d and 74c and passes at a right angle through the multidirectional retaining clip 76. Finally, if the overflow tube 80 extends to notch 72d, then the overflow tube 80 may bypass the series of retaining clips 74a, 74b, 74c and 74d completely. In the preferred embodiment, the series of retaining clips 74d are the shortest of all the series of retaining clips 74a, 74b, 74c and 74d. Retaining clips 74d gradually increase in height as they approach the multi-directional retaining clip 76. On the other hand, the series of retaining clips 74a, 74b and 74c are substantially identical and are taller than the retaining clips 74d. Retaining clips 74a, 74b and 74c gradually increasing still further in height moving away from the multi-directional retaining clip 76 as they approach the plurality of notches 72a, 72b and 72c, respectively.

Figure 4:
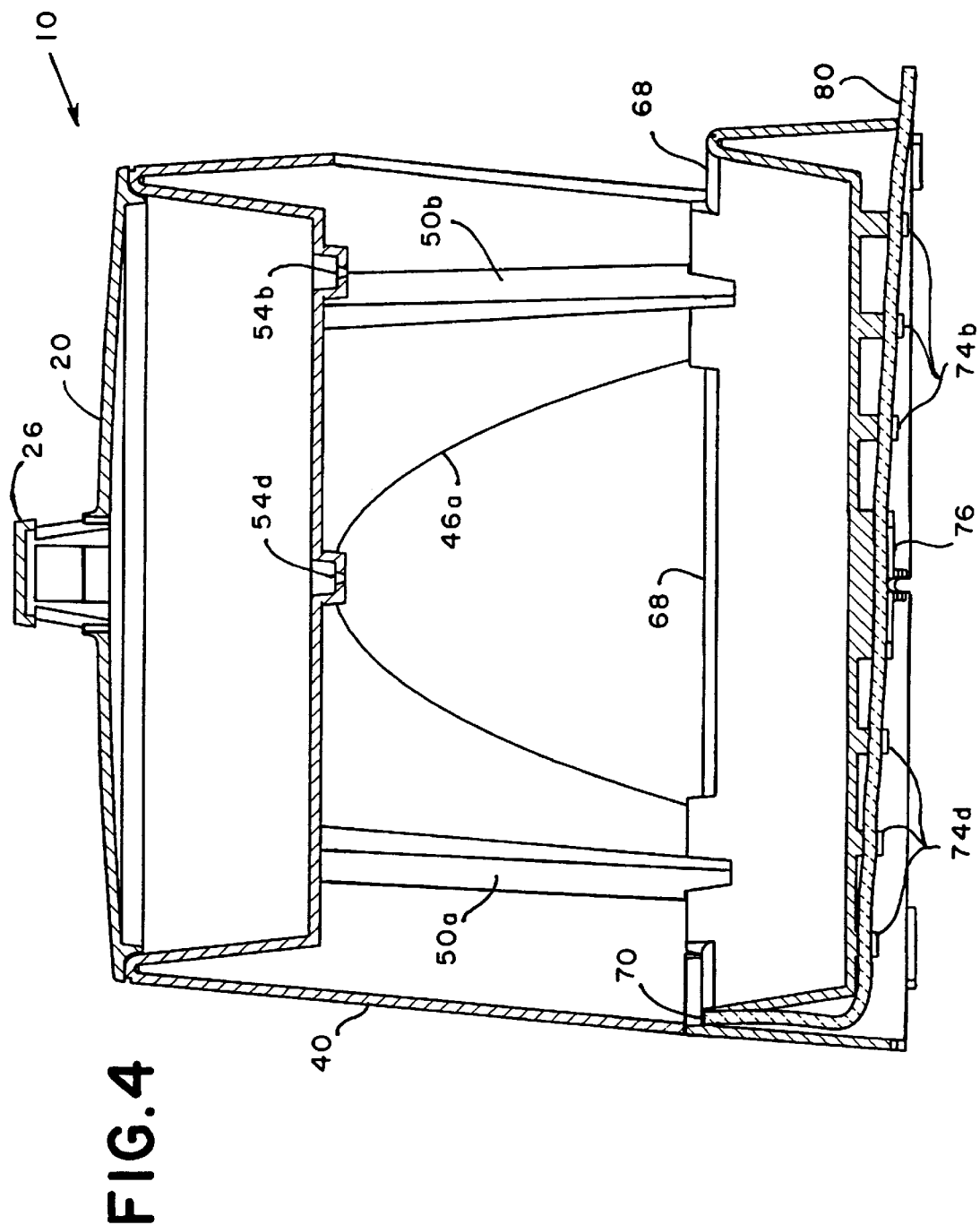
FIG. 4 is a cross sectional view taken through a centerline and an overflow hole of the bird bath in accordance with the present invention.

Referring to FIG. 4, a cross sectional view taken through a centerline and the overflow hole 70 of the bird bath 10 looking outward toward the notch 72a and through the opening 46a is shown. In this view, the bird bath 10 is shown assembled. It is important to note that the overflow hole 70 is positioned vertically below the perch 68. In this manner, the perch 68 stays dry even if the droplets from the plurality of drain holes 54a, 54b, 54c and 54d cause the water in the basin 66 to rise because the water in the basin 66 cannot rise above the overflow hole 70. The advantage of keeping the perch 68 dry is that ice does not form on the perch allowing for dry feet and more secure footing for the bird.

With the structure of the bird bath 10 described as above, the structural relationships of the various components, as well as the functional and operational characteristics, will now be described. Referring to FIGS. 2, 3 and 4, the plurality of openings 46a, 46b and 46c are evenly spaced at intervals of approximately 90° around the circumference of the cylindrical exterior wall 41. Therefore, from the right most edge of the opening 46a to the left most edge of the opening 46c encompasses approximately 240° around the circumference of the cylindrical exterior wall 41. Thus, approximately 120° of the cylindrical exterior wall 41 remains solid. This allows the bird bath 10 to be arranged so that the solid portion of the cylindrical exterior wall 41 faces the predominate wind direction so as to shelter the water in the basin 66 from cold winter breezes.

Referring to FIG. 1, it should now be apparent that the basin 66 contains a supply of water which a bird may access by flying directly through any one of the plurality of openings 46a, 46b and 46c and landing in the basin 66. In the alternative, a bird may choose to access the water in the basin 66 by landing on the perch 68 and bobbing down to reach the water in the basin 66.

It should also now be apparent that the supply of water in the reservoir 52 is utilized to replenish the supply of water in the basin 66. Due to gravity, the supply of water in the reservoir 52 forms droplets which fall through the plurality of drain holes 54a, 54b, 54c and 54d and land in the basin 66 which is directly beneath the reservoir 52. Thus, the water in the basin 66 is replenished. To control the rate at which the droplets fall, the plurality of drain holes 54a, 54b, 54c and 54d may be individually and selectively plugged by a cork stopper (not shown) or a grommet (not shown). In one variation, the plurality of drain holes 54a, 54b, 54c and 54d may be of different diameters to allow for different flow rates. Alternatively, valves (not shown) may be inserted into the plurality of drain holes 54a, 54b, 54c and 54d to provide even more precise control over the droplets and flow rates. Thus, those skilled in the art will appreciate that various combinations of these techniques may be employed to regulate the rate at which water descends from the reservoir 52 to the basin 66. The more droplets the greater the ripple effect at the surface of the water in the basin 66 and the less likely that the water will freeze.

Those skilled in the art will now recognize that the water descends from the reservoir 52 also serves to keep the supply of water in the basin 66 from freezing. This is because the droplets cause a ripple as they strike the supply of water in the basin 66. As is well known, moving water is much less likely to freeze than stationary water due to turbulence and kinetic energy. Because the supply of water in the reservoir 52 is completely protected from the outside elements, it will resist freezing for a relatively longer period of time than if it where exposed. Since ice forms on the top surface of water and because the droplets are supplied by the bottom of the supply of water in the reservoir 52, droplets will continue to form even after the supply of water in the reservoir 52 begins to freeze. Additionally, by striking the top surface of the supply of water in the basin 66, the formation of ice crystals is prevented.

Generally, the plurality of drain holes 54a, 54b and 54c are biased outward toward the exterior wall 41 and centered about the plurality of openings 46a, 46b and 46c, respectively, so as to keep the water in the basin 66 which is nearest the perch 68 from freezing even if other portions of the water in the basin 66 do freeze. In this manner, access to potable water is provided to the bird even in temperatures which are well below freezing. However, it is important that the plurality of drain holes 54a, 54b and 54c are not biased too far outward so that the droplets splash the perch 68. Otherwise, the desirability of a dry perch would be lost. Because the droplets can be regulated, as described above, a proper amount of water flow from the reservoir 52 to the basin 66 can be selected depending upon the upcoming weather conditions.

Together, the overflow tube 80, the series of retaining clips 74a, 74b, 74c and 74d and the multi-directional retaining clip 76 can be used to direct the overflow water to a desired location. Periodically, the water in the reservoir 52 will need to be replenished. Therefore, access to the bird bath 10 is necessary. So that the overflow water does not create mud or ice on a side of the bird bath 10 that provides primary access, the overflow tube 80 may be repositioned, accordingly, away from the direction of primary access.

It should now be apparent to those skilled in the art that the features of the bird bath 10 allow for optimized positioning and usage. First, the birth bath 10 may be positioned so that the solid portion of the exterior 41 faces the predominant wind direction. Second, the overflow tube 80 may be positioned away from the primary direction of access to the bird bath 10.

Many features of the preferred embodiment represent design choices selected to best exploit the inventive concepts as implemented in a bird bath for pedestal or table mounting. However, various modifications will readily occur to those skilled in the art for incorporating the innovative concepts of the present invention in a bird bath for suspension mounting.

Those skilled in the art will likely find still further modifications and substitutions without departing from the inventive concepts disclosed. For example, the retaining clips may be replaced by any suitable fastener like apparatus. As another example, the multi-directional retaining clip may not even be necessary so long as the overflow tube is pliable enough to bend along a desired path. As still another example, the openings in the exterior wall may take on any desired shape or arrangement. However, in the preferred embodiment it is desirable to leave a substantial portion of the exterior wall solid for the reasons discussed above.

Therefore, the inventive concept in its broader aspects is not limited to the specific details of the preferred embodiments but is defined by the appended claims and their equivalents.

What is claimed is:

1. A bird bath comprising:
    a base including a basin for holding a first supply of water having a top surface for a bird to access, the basin including a perch and an overflow hole located vertically below the perch so that level of the first supply of water in the basin does not rise above the overflow hole and the perch remains dry;
    a housing including a reservoir for holding a second supply of water, the housing spaced vertically above the base so that the reservoir is positioned above the basin, the reservoir including a drain hole in alignment over the first supply of water for allowing water to drop directly from the second supply of water to the first supply of water striking the top surface of the first supply of water and causing a ripple on the first supply of water and wherein the drain hole is spaced vertically above the overflow hole so that water dropping from the second supply of water continues to strike the top surface of the first supply of water even when the top surface of the first supply of water has reached the drain hole.

2. The bird bath of claim 1, wherein:
the housing includes an exterior wall adapted to allow the housing to be mounted to the base, the exterior wall includes an opening adjacent to the perch for the bird to use in accessing the first supply of water in the basin.

3. The bird bath of claim 2, further comprising:
an overflow tube having one end operatively connected to the overflow hole; and wherein
the base includes a plurality of retaining clips for directing an other end of the overflow tube to a desired location along the periphery of the base.

4. The bird bath of claim 3, further comprising:
means to regulate the flow rate of water from the second supply of water in the reservoir to the first supply of water in the basin.

5. The bird bath of claim 4, further comprising:
a cover adapted to be detachably mounted to the housing so as to seal the second supply of water off from ambient air.

6. The bird bath of claim 5, wherein:
the exterior wall is of generally cylindrical shape; and
the opening in the exterior wall of the housing is one of a plurality of openings spaced along the circumference of the exterior wall within a span less than about 240°.

7. The bird bath of claim 6, wherein:
the drain hole in the reservoir is one of a plurality of drain holes corresponding to the plurality of openings which are biased toward the exterior wall of the housing so that water drops from the second supply of water to the first supply of water causing the ripple on the first supply of water adjacent to the perch.

8. The bird bath of claim 7, wherein:
the means to regulate the flow rate of water is a valve in operative communication will at least one of the plurality of drain holes.

9. A bird bath comprising:
a base including a basin for holding a first supply of water for a bird to access;
a housing including a reservoir for holding a second supply of water, the housing spaced vertically above the base so that the reservoir is positioned above the basin, the reservoir including a drain hole for allowing water to drop from the second supply of water to the first supply of water causing a ripple on the first supply of water; and
means for changing the flow rate of water from the second supply of water in the reservoir to the first supply of water in the basin.

10. The bird bath of claim 9, wherein:
the basin includes a perch and an overflow hole located vertically below the perch so that level of the first supply of water in the basin does not rise above the overflow hole and the perch remains dry.

11. The bird bath of claim 10, wherein:

the housing includes an exterior wall adapted to allow the housing to be mounted to the base, the exterior wall includes an opening adjacent to the perch for the bird to use in accessing the first supply of water in the basin.

12. The bird bath of claim 11, further comprising:

an overflow tube having one end operatively connected to the overflow hole; and wherein the base includes a plurality of retaining clips for directing an other end of the overflow tube to a desired location along the periphery of the base.

13. The bird bath of claim 12, further comprising:

a cover adapted to be detachably mounted to the housing so as to seal the second supply of water off from ambient air.

14. The bird bath of claim 13, wherein:

the exterior wall is of generally cylindrical shape; and the opening in the exterior wall of the housing is one of a plurality of openings spaced along the circumference of the exterior wall within a span less than about 240°.

15. The bird bath of claim 14, wherein:

the drain hole in the reservoir is one of a plurality of drain holes corresponding to the plurality of openings, the plurality of drain holes are biased toward the exterior wall of the housing so that water drops from the second supply of water to the first supply of water causing the ripple on the first supply of water adjacent to the perch.

16. The bird bath of claim 15, wherein:

the means to regulate the flow rate of water is a valve in operative communication will at least one of the plurality of drain holes.

17. A bird bath comprising:

a base including a basin for holding a first supply of water for a bird to access;

a housing including a reservoir for holding a second supply of water having a top surface, the housing spaced vertically above the base so that the reservoir is positioned above the basin, the reservoir including a drain hole for allowing water to drop from the second supply of water to the first supply of water causing a ripple on the first supply of water; and wherein the drain hole is located below the top surface of the second supply of water so that water flows into the drain hole from below the top surface of the second supply.

18. The bird bath of claim 17, wherein:

the basin includes a perch and an overflow hole located vertically below the perch so that level of the first supply of water in the basin does not rise above the overflow hole and the perch remains dry.

19. The bird bath of claim 17, further comprising:

means for changing the flow rate of water from the second supply of water in the reservoir to the first supply of water in the basin.

20. The bird bath of claim 19, wherein:

the basin includes a perch and an overflow hole located vertically below the perch so that level of the first supply of water in the basin does not rise above the overflow hole and the perch remains dry.

* * * * *